Referring to FIGURE 1, there is shown an embodiment of the circuit of the present invention comprising a series connected regulator vacuum tube 10, a current sensing resistor 12, a variable load 14, and an unregulated direct-current source 16. A voltage divider comprising a resistor 18 and a Zener diode 20 is connected in parallel with the current sensing resistor 12 by means of terminals 22, 24, and 26. The control grid 28 of the regulator vacuum tube 10 is connected to terminal 24 at the junction of resistor 18 and Zener diode 20.

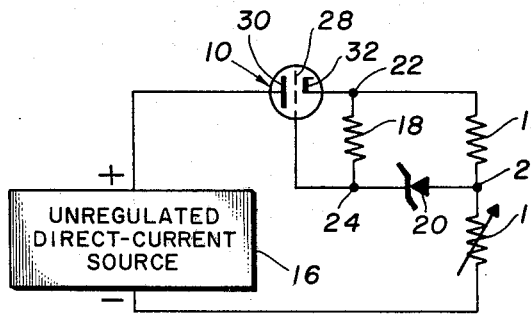
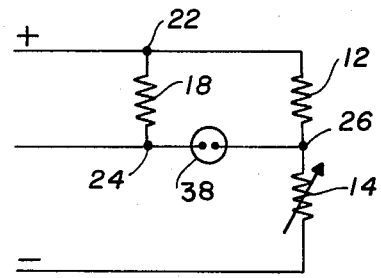
FIG. 1.   FIG. 3.
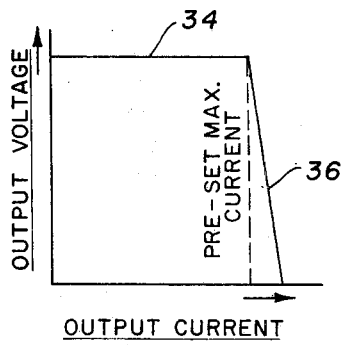
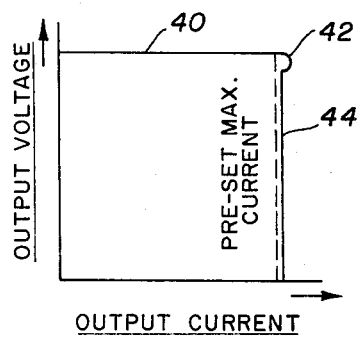
FIG. 2.   FIG. 4.
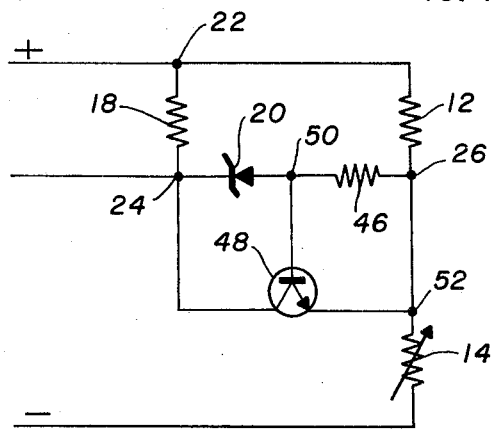
FIG. 5.
INVENTORS
LEWIS C. GARRETT
JAMES W. HARRISON, JR.
BY
Roy H. Massengill
ATTORNEY ure 3 is a partial schematic drawing of a modification of the current limiting means of FIGURE 1, further in accordance with this invention, FIGURE 4 is a typical output voltage-current characteristic of the embodiment of FIGURE 2, and FIGURE 5 is a partial schematic drawing of yet another embodiment of this invention.

The series connected regulator vacuum tube 10 includes a plate 30 and a cathode 32 in addition to the grid 28. The gain provided by the regulator vacuum tube 10 determines the rate at which the load current can be decreased to zero after the critical value thereof has been attained. The regulator vacuum tube 10 utilized should have adequate internal insulation to resist the high voltage developed across it when the control grid 28 has a large negative voltage impressed thereupon.

In the current limiting phase of operation, the bias voltage is produced by the Zener diode 20 having a polarity to be conductive toward terminal 26. The Zener diode 20 is characterized by a very high resistance until a critical voltage drop across it is reached, subsequent thereto a small increase in voltage results in a large increase in current flow. Due to this characteristic very little current flows through resistor 18 until the voltage drop across resistor 12 reaches the value of the breakdown voltage. Thus, up to this point the grid bias voltage is very small and is solely the result of the thermal leakage through the Zener diode 20. When the voltage drop across resistor 12 exceeds the breakdown or avalanche voltage of the Zener diode 20 the current through the Zener diode 20 increases virtually instantaneously to result in an increase in voltage drop across the resistor 18 which in turn increases the negative bias voltage on the grid 28 at such a rate that a very rapid increase in the voltage drop across the regulator vacuum tube 10 occurs tending to reduce the output voltage to zero.

The operation of the current limiting circuit of this invention is a two phase function, namely, a regulated output voltage phase and the current limiting phase. FIGURE 2 illustrates these two phases more clearly wherein line 34 represents the output voltage developed across a load for an increasing output or load current. This phase extends from zero current to the pre-set maximum or critical current and occurs when there is zero volts across the Zener diode 20. The current limiting phase of operation is represented by line 36, which extends from the point of the pre-set maximum current to the point when zero output voltage exists across the load with the current at zero output voltage having a value only slightly greater than the pre-set maximum current where current limiting was initiated.

The partial circuit diagram of FIGURE 3 illustrates a modification of the circuit of FIGURE 1 in that the Zener diode 20 is replaced with the neon lamp 38 with the remaining components being as described above. The substitution of the neon lamp for the Zener diode is made possible by the fact that both elements are characterized by a very high resistance prior to the attainment of the critical breakdown voltage, and subsequent thereto having the characteristic that a small increase in voltage results in a large increase in current flow therethrough.

FIGURE 4 illustrates a typical output voltage-current characteristic for the schematic arrangement of FIGURE 3 wherein line 40 represents the substantially constant output voltage developed across the load for an increasing output current and extends from zero current to the pre-set maximum current point with this condition existing when there is zero volts across the neon lamp 38. The current limiting state is represented by knee portion 42 and the substantially vertical straight line 44 extending from the pre-set maximum current point to the point of zero voltage. A comparison of the increase in current, above the pre-set maximum level, during the current limiting state of FIGURES 2 and 4 indicate that the circuitry of FIGURE 3 provides a smaller increase therein than does the circuitry of FIGURE 1.

The partial circuit diagram of FIGURE 5 illustrates yet another variation of the current limiting circuit of this invention wherein the circuit of FIGURE 1 is modified to include the resistor 46 in series with the Zener diode 20 and the transistor 48 in parallel with the Zener diode 20. The transistor 48 is common collector connected to terminal 24 with the base thereof connected to terminal 50, the junction of the Zener diode 20 and the resistor 46, while the emitter lead is connected to terminal 52. In this circuitry arrangement the transistor 48 is open circuited until the voltage across the Zener diode 20 has reached the level of breakdown.

The circuit of FIGURE 5 provides for an output voltage-current characteristic similar to that of FIGURE 2 with the exception that the slope of the current limiting line 36 is less pronounced, i.e. the output current level attained at zero volts is slightly greater for the circuitry of FIGURE 5 than for the circuitry of FIGURE 1.

The following tables provide a list of the components utilized and the current limiting ability of each of the previously described circuits.

The effect of subjecting the above described circuitry to sudden applications of a low impedance load, as might exemplify the most probable type of accidental occurrence was tested by studying the transient response thereof on an oscilloscope.

An additional resistor was placed in parallel with the load resistor 14 and the oscilloscope leads were connected thereto. The voltage drop across the latter resistor was displayed on the oscilloscope which was set on single sweep mode to trigger a sweep when the load across the load resistor was suddenly reduced to a low value. The load resistor 14 had the value of 1 megohm while the suddenly applied parallel resistor had a resistance value of 100 ohms. This provided a load change having a factor of 10,000:1. The output voltage dropped from about 330 volts to substantially zero volts while the current rose from 0.5 to 1.0 milliampere.

The slope of the current limiting line 36 of FIGURE 2, for the above, is 0.66 volt per microampere which corresponds to the figures presented in Table I where the regulator vacuum tube 10 is a triode connected 6SJ7, the series current sensing resistor 12 has a value of 82K ohms, the voltage divider resistor 18 has a value of 100K ohms, and the Zener diode 20 has the voltage of value of 22 volts.

While the above described circuits exemplify excellent current limiting abilities it is to be noted that the circuitry of FIGURES 1 and 2 provide the best results since they accommodate a larger voltage drop per minimum

TABLE I (REFERENCE FIGURE 1)

| Regulator Tube [1] | Component Name | | | | Slope of Current Limiting Line No. 36 of FIGURE 2 (volts drop/microampere) |
|---|---|---|---|---|---|
| | Resistor (ohms) | Resistor (ohms) | D.C. Source (volts) | Zener Diode [2] (volts) | |
| | FIGURE 1 Item Number | | | | |
| 10 | 12 | 18 | 16 | 20 | |
| ½ of 6SL7 | 20K | 27K | 400 | 9.1 | 0.94 |
| | 20K | 50K | 400 | 9.1 | 1.12 |
| | 20K | 100K | 400 | 9.1 | 1.27 |
| | 20K | 200K | 400 | 9.1 | 1.15 |
| Triode connected 6SJ7 | 40K | 100K | 400 | 31 | 0.40 |
| | 40K | 100K | 400 | 22 | 0.47 |
| | 47K | 50K | 400 | 22 | 0.35 |
| | 47K | 100K | 400 | 22 | 0.52 |
| | 82K | 50K | 400 | 22 | 0.50 |
| | 82K | 100K | 400 | 22 | 0.66 |
| | 82K | 200K | 400 | 22 | 0.86 |

See footnotes at end of Table III.

TABE II (REFERENCE FIGURE 3)

| Regulator Tube [1] | Component Name | | | | Slope of Current Limiting Line No. 44 of FIGURE 4 (volts drop/microampere) |
|---|---|---|---|---|---|
| | Resistor (ohms) | Resistor (ohms) | D.C. Source (volts) | Neon Lamp [3] (D.C. volts) | |
| | FIGURE 3 Item Number | | | | |
| 10 | 12 | 18 | 16 | 38 | |
| ½ of 6SL7 | 100K | 220K | 400 | 90 | After breakdown—infinite drop. |

See footnotes at end of Table III.

TABLE III (REFERENCE FIGURE 5)

| Regulator Tube [1] | Component Name | | | | | | Slope of Current Limiting Line No. 36 to FIGURE 2 (voltage drop/microampere) |
|---|---|---|---|---|---|---|---|
| | Resistor (ohms) | Resistor (ohms) | D.C. Source (volts) | Zener Diode [2] (volts) | Resistor (ohms) | Transistor 2N636A [4] | |
| | FIGURE 5 Item Number | | | | | | |
| 10 | 12 | 18 | 16 | 20 | 46 | 48 | |
| ½ of 6SL7 | 20K | 27K | 400 | 9.1 | 0 | | 0.7 |
| | 20K | 27K | 400 | 9.1 | 1K | | 0.91 |

[1] 6SL7 is a dual triode vacuum tube.
6SJ7 is sharp cut-off pentode vacuum tube.
[2] 9.1 volt Zener diode—International Rectifier No. IN3019.
31 volt Zener diode—Sarkes Tarzian No. IT31.
22 volt Zener diode—Sarkes Tarzain No. IT22.]
[3] Neon lamp—General Electric No. NE-51.
[4] Electric Transistor Corporation—Transistor No. 2N636A.

current increase while at the same time provide the simplest constructed circuit.

We claim:

1. An improved circuit for limiting the current from an unregulated direct-current source of potential through a load impedance by rapidly reducing the output voltage to zero when a predetermined maximum current is induced, said circuit comprising first and second input and first and second output terminals, said input terminals being connected across said direct-current source of potential, said output terminals being connected across said load impedance; a fixed resistor; an electron discharge device comprising at least a plate, a control grid and a cathode, said plate being connected to said first input terminal and said cathode being connected through said resistor to said first output terminal; and, a Zener diode connected between said control grid and said first output terminal and poled to be conductive when avalanched in a direction towards said control grid.

2. The circuit as described in claim 1 wherein the Zener diode is a neon tube.

3. The circuit as described in claim 1 further characterized by a transistor connected in parallel with the unidirectionally conducting device.

References Cited

UNITED STATES PATENTS 2,697,811 12/1954 Deming _____ 323—4 X

JAMES D. TRAMMELL, Primary Examiner

U.S. Cl. X.R.

323—9